United States Patent [19]

Dissmore

[11] 4,290,392
[45] Sep. 22, 1981

[54] FUEL SYSTEM FOR IC ENGINE

[76] Inventor: James R. Dissmore, 63 Margaret Rd., East Taunton, Mass. 02780

[21] Appl. No.: 89,627

[22] Filed: Oct. 29, 1979

[51] Int. Cl.³ ............................................. F02D 19/12
[52] U.S. Cl. ................................ 123/1 A; 123/25 C; 123/25 E; 123/198 A
[58] Field of Search ............. 123/1 A, 3, 25 C, 25 D, 123/25 E, 198 A, 536

[56] References Cited

U.S. PATENT DOCUMENTS

| | | | |
|---|---|---|---|
| 2,775,961 | 1/1957 | Petre | 123/1 A |
| 2,862,482 | 12/1958 | Hart | 13/536 |
| 2,879,753 | 3/1959 | McKinley | 123/25 C |
| 3,933,132 | 1/1976 | Kishishita | 123/25 C |
| 3,958,538 | 5/1976 | Hashino | 123/1 A |
| 3,963,000 | 6/1976 | Kosaka et al. | 123/1 A |
| 3,985,107 | 10/1976 | Veno et al. | 123/1 A |
| 4,018,192 | 4/1977 | Eft | 123/25 C |

*Primary Examiner*—Ira S. Lazarus
*Attorney, Agent, or Firm*—Robert J. Doherty

[57] ABSTRACT

A fuel system for and a method of operating an internal combustion engine wherein an aqueous solution of hydrogen peroxide is injected into the combustion chamber after a conventional fuel and combustion gas mix (i.e. gasoline-air) has been ignited. The hydrogen peroxide and water charge supplies additional oxygen to insure complete combustion of the hydrocarbon fuel and simultaneously the high energy content present in the hydrogen peroxide serves to boost the power output of the engine. Furthermore, the water in the hydrogen peroxide charge produces a washing effect on the engine combustion chamber which enables combustion to proceed at a lowered temperature which results in lowered $NO_x$ content of the exhaust gas. The more complete fuel combustion brought about by this system also eliminates the need for catalytic converters.

9 Claims, 3 Drawing Figures

FUEL SYSTEM FOR IC ENGINE

BACKGROUND AND SUMMARY OF THE INVENTION

This invention relates to a improved fuel system for internal combustion engines and a novel method of operating such engines and more particularly to a system which "burns" an aqueous solution of hydrogen peroxide in order to increase the efficiency and reduce the undesirable emissions of such engines. In light of the high fuel content and explosion characteristics of hydrogen peroxide, it has been proposed and various attempts have been made to utilize such as a fuel additive for internal combustion engines in order to provide a power "boost" thereto. The following U.S. patents are representative of such technology wherein hydrogen peroxide either alone or in aqueous solution is utilized as part of the fuel mix for internal combustion engines either by injection into the intake system along with the normal fuel-combustion gas mixture or by reforming the hydrogen peroxide prior to its combination with such fuel mixture: U.S. Pat. Nos. 3,958,538 issued May 25, 1976, 3,963,000 issued June 15, 1976 and 3,985,107 issued Oct. 12, 1976.

Such systems, however, require rather complex preparatory equipment and a high degree of operational caution because of the explosive nature of hydrogen peroxide. Also in such known systems, the hydrogen peroxide because of its highly explosive nature, in effect lowers the octane rating of the resultant fuel (makes it easier to burn) and can cause undesirable pre-ignition thereof, i.e. engine knock. There accordingly remains a need for a system which utilizes the high fuel content of hydrogen peroxide in an efficient manner with both existing engines and those specifically designed for this purpose.

It is accordingly an object of the present invention to provide a fuel system for internal combustion engines and a novel manner of operating engines incorporating such fuel system such that increased power and fuel efficiency is achieved in part by the more complete combustion of the fuel mixture which in addition reduces undesirable exhaust emissions, i.e. produces a higher percentage of $CO_2$ and a lower percentage of $NO_x$.

A further object of the present invention is to provide an improved fuel system such that the use of catalytic converters in current autombles may be eliminated.

These and other objects of the present invention are accomplished by introducing a charge of a pre-determined amount of an aqueous solution of hydrogen peroxide into the combustion chamber of an internal combustion engine during the power cycle thereof and after ignition of the normal fuel mixture thereof. The hydrogen peroxide in the charge is decomposed so as to produce additional oxygen which enables more complete combustion of the fuel mixture. The water present by reason of the aqueous hydrogen peroxide solution turns to steam to additionally supply an increased vapor pressure within the combustion chamber to increase the power or torque thereof and to additionally in effect wash down the cylinder walls so as to produce a cooling effect that somewhat reduces the operating temperatures within the chamber so as to minimize the amount of $NO_x$ produced Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
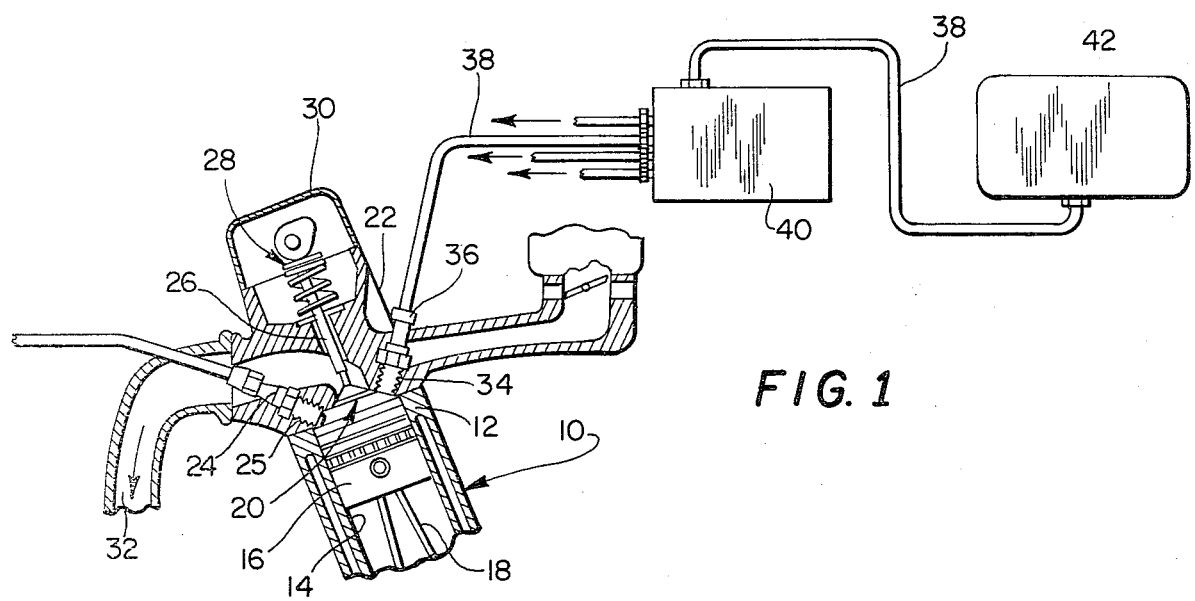
FIG. 1 is a elevational cross-section view somewhat in schematic form showing the system of the present invention incorporated into a internal combustion engine of special design.

Turning now to the drawing and particularly FIG. 1, a partial section through a conventional V-style gasoline engine 10 is shown. The block 12 of such engine 10 is provided with one or more (conventionally 6 or 8) cylinder bores 14 each in turn adapted to receive a piston 16 of conventional construction and in turn attached to a crank arm 18. As is known, the upper portion of each of the bores 14 in part forms a combustion chamber 20 into which a normal air and gasoline fuel mixture is admitted in timed sequence by an intake valve (not shown) positioned within the intake manifold 22. Upon ignition of the fuel mixture, a controlled explosion takes place which in turn forces the piston downwardly in the cylinder so as to actuate the power stroke of the engine. Such ignition is carried out by a spark plug 24 threadably received in a bore 25 and coupled to an electrical spark distributor (not shown) as is known in the art. The exhaust gases resulting from such explosion are exhausted from the cylinder on the upstroke cycle thereof through an exhaust valve 26 suitably spring operated by a cam shaft assembly 28. A valve cover 30 is positioned over the valves and an exhaust manifold 32 insures the direction of the exhaust gases to the exhaust system (also not shown).

The above-described engine system departs from the conventional operation and construction as above-indicated by the presence of an additional bore 34 directed through the block 12 or the intake manifold 22 and in communication with the combustion chamber 20. A suitable fitting 36 is threadably or otherwise received within the bore 34 and is in turn connected by a conduit 38 to an injector pump 40 of known design, i.e. such injector pump 40 may take the overall construction of pump systems utilized in modern fuel injection IC engines. Further conduit 38 connects the injection pump 40 with a storage tank 42 adapted for receipt of an aqueous solution of hydrogen peroxide preferably in concentrations from about 10 to 30% hydrogen peroxide. Suitable thermal insulation (not shown) may be utilized to maintain a relatively low internal temperature to the storage tank 42 so as to reduce the tendency for the hydrogen peroxide solution from decomposing or becoming unstable. In this regard, the conduits 38 as well as those portions of the injector pump coming in contact with the hydrogen peroxide solution are preferably formed from corrosion resistant, non-oxidizable materials. In addition, the hydrogen peroxide solution may be inhibited from decomposition by the use of known stabilizers or negative catalysts, such as acetanilid.

Operation of the engine system above-described is conventional except that after ignition of the conventional fuel (gasoline-air) mixture from the carburetor has been initiated and during the power stroke of the piston 16, a charge of hydrogen peroxide solution from the injector pump is forced into the combustion chamber 20. The amount of such charge is stoichioetrically calculated so as to be adequate to supply enough oxygen to complete the combustion of the hydrocarbons present in the conventional air and gasoline fuel mixture. By injecting the hydrogen peroxide charge during the power stroke and after the rapid burning of the conventional fuel mixture has been initiated, the highly explosive nature of the hydrogen peroxide present wil not contribute to pre-ignition of the conventional fuel charge and in effect undesirably lower the octane rating of such fuel as occurs with those previously described systems which utilize hydrogen peroxide as a component of the fuel mixture admitted to the combustion chamber through the intake manifold either as a separate component or as a reformed constituent of the fuel mixture. In this regard, it has been found that injection of the hydrogen peroxide charge at about 4 degrees past top dead center of the operational cycle of the engine is a particularly effective time in which to inject the hydrogen peroxide charge although enhanced results occur so long as the charge is injected during the power cycle and after ignition of the conventional fuel mix has been initiated; realizing of course that suitable time should be provided for the complete burning of the fuel mixture in the presence of the hydrogen peroxide charge to be most effective.

The elevated temperature within the combustion chamber immediately turns the hydrogen peroxide into water and oxygen as follows:

$$H_2O_2 \rightarrow H_2O + \tfrac{1}{2}O_2$$

The water so produced and that present in the aqueous hydrogen peroxide solution is turned to water vapor. Accordingly, the increased concentration of oxygen in the chamber serves to insure that the fuel mixture is efficiently burned to minimize the presence of both hydrocarbons and carbon monoxide in the exhaust while the presence of the water vapor serves to reduce the temperature of combustion thereof such that production of $NO_x$ is mimimized. Accordingly, the present system achieves two of the primary goals of the automobile industry-that of reducing exhaust emissions as well as increasing the efficiency of burning so that enhanced gasoline mileage is achieved. In addition, the burning of the high fuel valve hydrogen peroxide creates added force that increases the power and torque output from the engine. Such increased burning efficiency also enables elimination of the expensive, heavy and otherwise wasteful use of catalytic converters to complete hydrocarbon combustion.

Although the present invention has been described in connection with gasoline operated internal combustion engines, it should be brought out that such invention has applicability with diesel type engines as well and that either type engine could operate on fuel mixtures other than gasoline and air.

Figure 2:
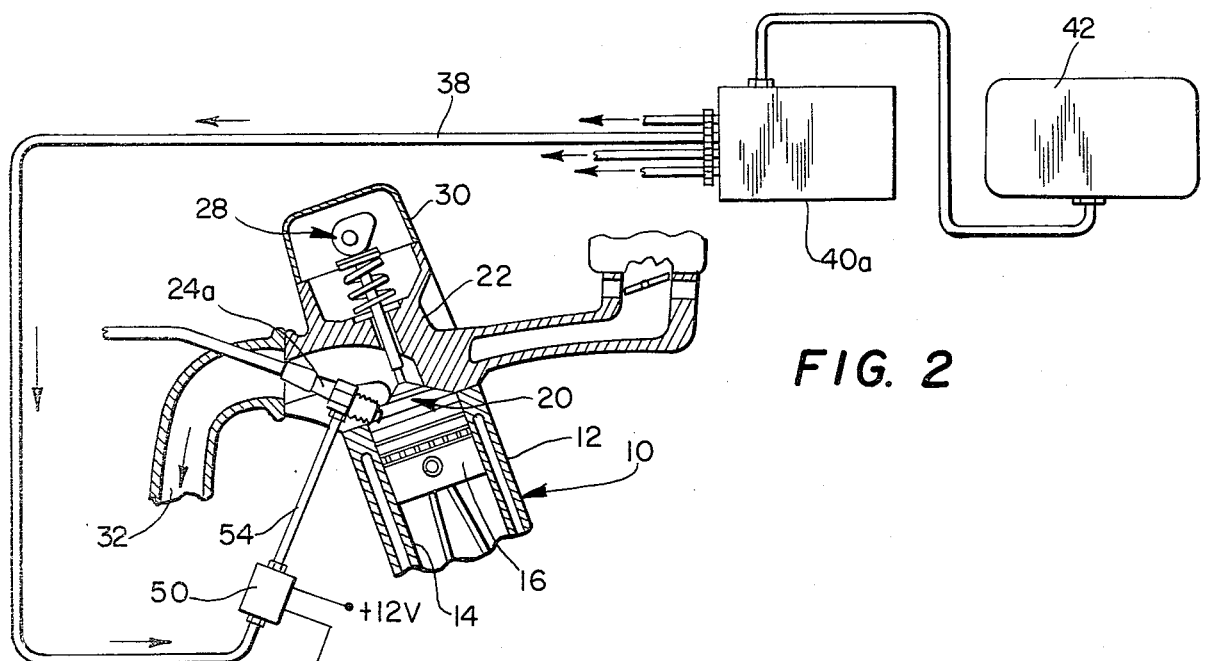
FIG. 2 is a view similar to FIG. 1 but showing the system of the present invention incorporated into an internal combustion engine of existing design.
Figure 3:
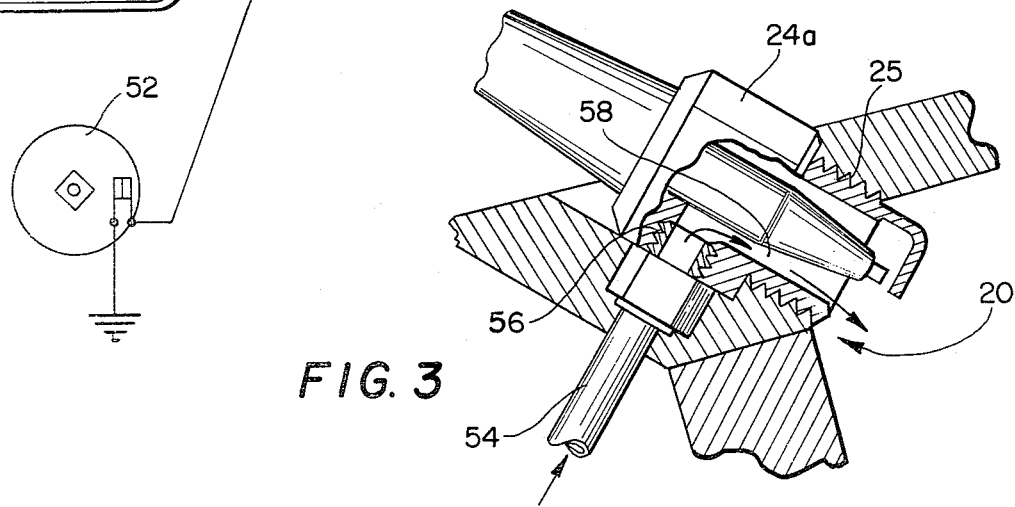
FIG. 3 is an enlarged partial view taken along the line 3—3 of FIG. 2 and shows in particular the modified spark plug construction utilized in the system shown in FIG. 2.

Turning now to FIGS. 2 and 3 of the drawing, an engine system similar to that shown in FIG. 1 is shown except that the hydrogen peroxide charge is introduced into the combustion chamber 20 via the bore 34 provided for receipt of a modified construction spark plug 24a such that presently available internal combustion engines may be retrofitted with the improved fuel system of the present invention. In that regard, the injector pump 40 is replaced by a pressure pump 40a which supplies the aqueous solution of hydrogen peroxide under pressure to a solenoid valve 50. The solenoid valve 50 is in turn suitably connected to the distributor 52 such that after the distributor activiates the spark plug 24a so as to ignite the conventional fuel charge, it activates the solenoid valve so as to open such and enable a predetermined amount of such aqueous hydrogen peroxide solution to be forced into the combustion chamber 20 via a connecting pipe or conduit 54. Such connecting pipe 54 is attached by a suitable threaded connection to a auxiliary bore 56 angularly opening into the spark plug bore 25. The spark plug 24a is also of a modified design and includes a channel 58 on one side thereof through which the aqueous solution is adapted to pass into the combustion chamber 20 via the bore 56 in timed sequence of the operation of the solenoid valve. In other respects, the operation of the engine shown in FIGS. 2 and 3 is the same as that previously indicated in FIG. 1.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An improved manner of operating an internal combustion engine including a combustion chamber, means for directing a hydrocarbon and combustion gas fuel mixture to said chamber and means for igniting said fuel mixture so as to cause a controlled explosion which initiates a power cycle of said engine comprising, directing a charge of a pre-determined amount of an aqueous solution of hydrogen peroxide into said combustion chamber after the initial ignition of said fuel mixture therein and during said power cycle thereof wherein more complete combustion of said hydrocarbon is achieved with an attendant increase in the power and-/or fuel efficiency.

2. The method set forth in claim 1, wherein said internal combustion engine includes at least one piston having a downwardly directed power stroke which is initiated at a top dead center position thereof and wherein said charge is directed into said chamber at about 4° past top dead center.

3. The method set forth in claim 1, said charge including an amount of hydrogen peroxide sufficient to provide added oxygen so as to stoichioetrically complete the combustion of said hydrocarbon portion of said fuel mixture.

4. The method of claim 1, said aqueous solution containing from about 10 to 30% hydrogen peroxide.

5. An internal combustion engine including a combustion chamber, a bore, a piston mounted for reciprocation in said bore between upper and lower positions therein and in part forming said chamber, means for directing a hydrocarbon fuel and combustion gas mixture to said chamber, and means for igniting said fuel-combustion gas mixture at the upper position of said piston so as to cause a controlled explosion which initiates a downward directed power stroke to said piston; the improvement comprising, means for directing a charge of a pre-determined amount of an aqueous solution of hydrogen peroxide into said combustion chamber in timed sequence to said engine operation so that said charge enters said chamber during the power downstroke of said piston and after the explosion of said fuel-combustion gas mixture has been initiated.

6. The improved engine as set forth in claim 5, including storage means for storing a supply of said aqueous solution of hydrogen peroxide in a relatively cool, relatively non-oxidizing atmosphere, and pump means for directing said hydrogen peroxide charge to said chamber in timed sequence to the operation of said engine.

7. The improved engine as set forth in claim 6, said pump means being an injector pump, said chamber having separate openings for introducing said charge thereinto and for igniting said fuel-combustion gas mixture.

8. The improved engine as set forth in claim 6, said chamber having an opening for receipt of said ignition means, said ignition means further including means for introducing said charge into said chamber through said chamber opening in timed sequence of said engine.

9. The improved engine of claim 8, said engine including an electrical distributor, said means for introducing said charge through said chamber opening including valve means operable by and in timed sequence with said distributor.

* * * * *